May 12, 1931.  J. F. WILSON  1,805,445
DECK DOORLOCK
Filed July 29, 1927
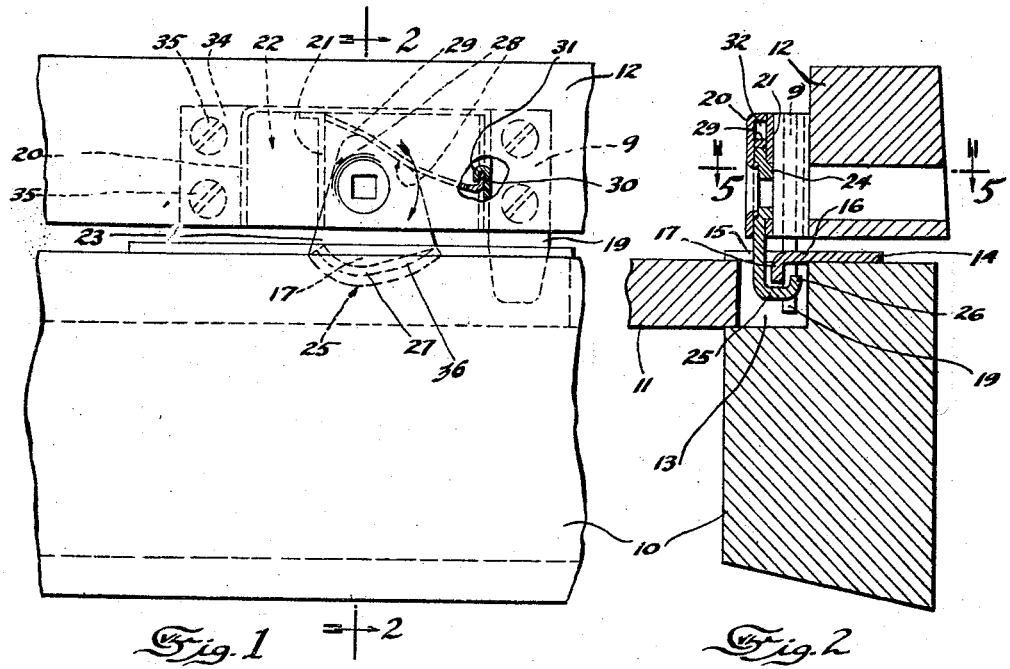
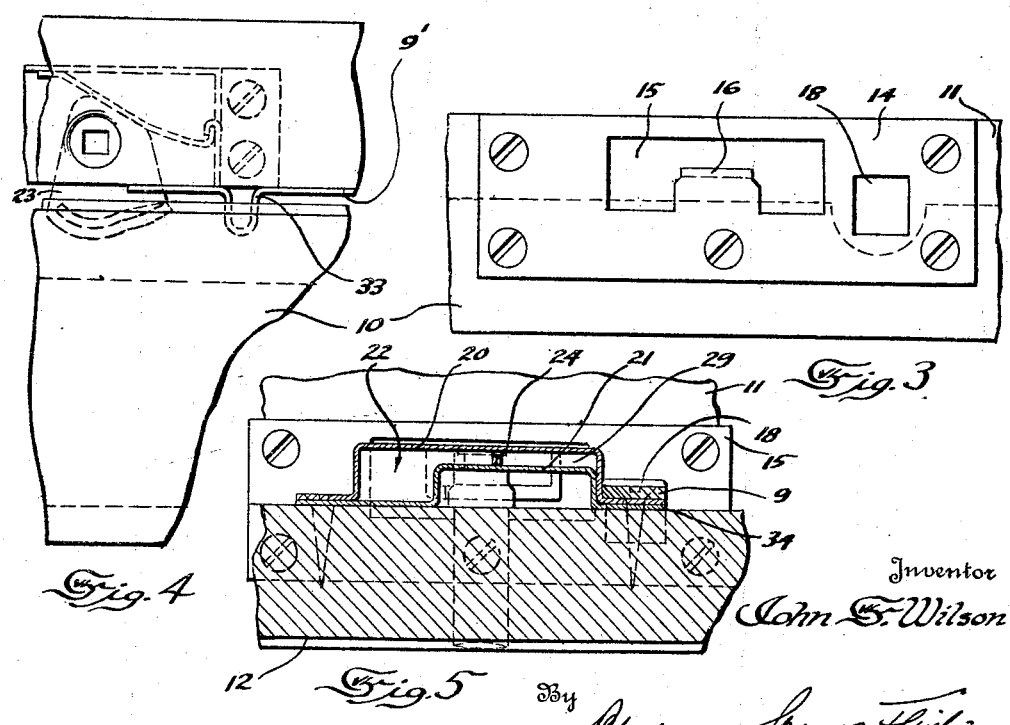

Patented May 12, 1931

1,805,445

UNITED STATES PATENT OFFICE

JOHN F. WILSON, OF DETROIT, MICHIGAN, ASSIGNOR TO GENERAL MOTORS CORPORATION, OF DETROIT, MICHIGAN, A CORPORATION OF DELAWARE

DECK DOORLOCK

Application filed July 29, 1927. Serial No. 209,250.

This invention relates to automotive vehicles and particularly to a lock for the door of the rear deck of a coupé.

It is the object of the invention to provide a lock which will hold the door of the deck against rattling and at the same time serve as the means for securing the door against opening by unauthorized persons. The novel lock of the present invention is particularly adaptable to coupé deck doors where the door extends down to the floor line.

The rear cross piece of the vehicle at the floor line is provided with a recess over which is secured a latch plate having a latching finger. To the inside of the rear frame member of the door there is secured a plurality of housings in which is pivoted a catch having a projecting flange which engages under the locking finger of the latch plate. The upper portion of the catch is formed into a cam which is engaged by a spring which will hold the catch in locked or unlocked position.

In order to further assure the proper fitting of the catch in locked position, provision is made for a depression in the catch which conforms in shape to the end of the projecting finger of the latch plate. When the finger and catch are in locked position the finger will be seated in the depression of the catch and tend to resist any changes which will move it out of the depression.

The invention is disclosed in the accompanying drawings in which:

Fig. 1 is a rear view of a portion of an automobile showing the invention applied thereto.

Fig. 2 is a section on the line 2—2 of Fig. 1.

Fig. 3 is a plan view of the latch plate attached to the floor boards and transverse support.

Fig. 4 is a view similar to Fig. 1 showing a slightly modified form of the invention.

Fig. 5 is a section on the line 5—5 of Fig. 2.

Referring to the numbered parts on the drawings, 10 indicates the rear transverse support or frame member of the body of an automobile, 11 the floor thereof and 12 the rear transverse frame member of the door of the deck. The transverse member 10 is provided with a recess 13 at its inner side and over this recess there is fastened the latch plate 14 having an opening 15 into which projects a finger 16 having its end downwardly bent as at 17.

The plate 14 has a second orifice 18 for the reception of the downwardly projecting arm 19 of the plate 9 secured to the flanged end portions of the housing members 20 and 21. The arm 19 serves to properly position the stationary and movable portion of the lock.

Between the housing members 20 and 21 provision is made for a recess 22 into which may swing the catch member 23 as it turns upwardly about its pivot 24 in the housing members 20 and 21. The catch 23, when in locked position, extends downwardly through the opening 15 and into the recess 13 and has its locking end preferably arcuately flanged or bent as shown at 25 which flange is in turn upwardly bent as shown at 26. When in locked position the flange 25 acts as a cam and underlaps the downwardly bent portion 17 of the finger 16 to securely hold the locked portions together and thereby prevent rattling.

The flanged or cam portion 25 of the catch 23 is further provided with a depression 27, the shape of which conforms to the shape of the lower portion of the bent end 17 of the finger 16, and when the catch is in locked position, as shown in Fig. 1, the projecting end 17 of the finger 16 closely fits within the depression 27. Due to the close interfitting of the finger 17 in the depression 27, the parts will be prevented from rattling and resistance will be offered to any force which tends to unseat the catch 23. Some force is necessary to cause the cam portion 25 to ride over the finger end and from an inspection of Fig. 1 it will be apparent that the part 36 of the cam 25 must be passed before the finger 17 is seated in the depression 27.

The upper portion of the catch 23 is formed into a cam surface 28 which contacts with a spring 29, the end of which is bent as shown at 30 and fastened under a lug 31 which may be pressed from the side of the housing 20. The spring 29 is positioned in a space between the housings 20 and 21 as shown in Fig. 2 and has its free end contacting with the cover 32 of the housing 20. From an inspection of Fig. 1 it will be obvious that as the catch 23 is swung in the direction of the arrow to unlocked position, the cam surface at present contacting with the spring 29 will be moved to the right, while the second cam surface now shown as free from the spring, will be brought into engagement therewith. With the second cam surface in engagement, the spring will hold the catch in unlocked position.

Referring to Fig. 4 it will be noted that instead of the plate 9 I provide a plate 9' having a looped portion 33 which extends into the opening 18 of the latch plate to secure it in position. The plate 9' may be secured to the frame member 12 in any suitable way.

The housing 21 is completely inclosed by the housing 20 and the two housings have overlapping flanges as shown at 34 by means of which they are secured to the transverse member 12 through the intermediary of the screws 35.

I claim:

1. In a door lock, a plate attached to the stationary member, a finger on said plate, a catch attached to the door, an arcuate flange projecting from said catch, a depression in said flange, said finger seating in said depression when the door is in locked position.

2. The combination of claim 1, and a spring to hold said catch in locked or unlocked position.

3. In a door lock, an apertured latch plate mounted on the stationary part, a finger projecting into said aperture, a bend at said finger end, a catch on the door extending into said aperture and engaging under said finger.

4. In a door lock a latch plate having a plurality of openings, a finger projecting into one of said openings and having a bent end, a housing, a catch secured to said housing and projecting into said opening to engage said finger, and a bar projecting from said housing into said other opening to position said catch and plate.

5. In a lock for the doors of vehicle decks comprising a housing on said door, a catch pivoted on said housing, a flange having an upturned end on said catch, a depression in said flange, a latch plate having an aperture, a finger projecting into said aperture, a bent end on said finger, said catch projecting under said finger with said bent end seated in said depression when said door is in locked position.

6. In a lock, a catch provided with a cam end, a depression formed in a portion of said cam end, a finger, said depression tightly closing on said finger to hold the lock in locked position and prevent rattling.

7. In a lock, a swinging catch, a bent cam end on said catch, said bent cam end being of arcuate formation, an upturned flange on said cam end a depression formed in a portion of said arc, and a finger, the end portion of which is adapted to tightly seat in said depression when said catch is swung to locked position.

8. In a lock, a stationary finger, a movable catch adapted to swing under said finger, an arc shaped cam end on said catch, a depression formed in said arc, said arc-shaped end adapted to ride over said finger and cause said finger to be seated in said depression and thereby hold said lock in locked position and prevent rattling.

In testimony whereof I affix my signature.

JOHN F. WILSON.